Figure 1:
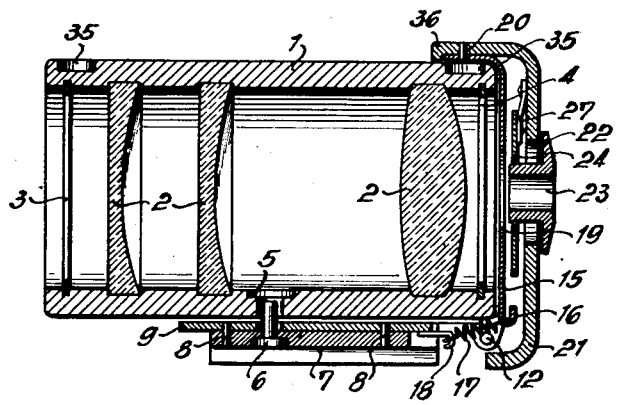

Nov. 27, 1956    R. SOMMER ET AL    2,771,810
REVERSIBLE VIEWFINDER FOR PHOTOGRAPHIC CAMERAS
Filed Sept. 17, 1954    2 Sheets-Sheet 1

INVENTORS
RICHARD SOMMER AND RICHARD HOFMEISTER
BY *Mock & Blum*
ATTORNEYS

United States Patent Office 2,771,810
Patented Nov. 27, 1956

2,771,810

REVERSIBLE VIEWFINDER FOR PHOTOGRAPHIC CAMERAS

Richard Sommer and Richard Hofmeister, Braunschweig-Gliesmarode, Germany, assignors to Voigtlander, A. G., Braunschweig, Germany, a corporation of Germany Application September 17, 1954, Serial No. 456,689

Claims priority, application Germany March 27, 1954

3 Claims. (Cl. 88—1.5)

This invention relates to viewfinders for photographic cameras and it has particular relation to viewfinders adapted to be used in photographic cameras provided with exchangeable objectives.

Photographic cameras adapted to be used with exchangeable objectives are usually provided with a built-in finder which is fitted to the normal objective. In order to adjust the image field of such finders to the image area included by the exchangeable objectives inserted in the camera, e. g. of wide angle field objectives or tele-objectives, auxiliary devices must be used. It has also been known to use in such cases a finder of particular construction which indicates an image field included by an objective of long focal length, in one direction, while being turned by 180°, the finder shows the image field included by an objective of short focal length, by viewing in the reversed direction.

The present invention relates to novel useful and advantageous improvements of such finders, which are denoted in the present application "reversible finders."

The known finders of this type are either fixedly connected with the camera body and pivotally fastened to the latter or they are auxiliary instruments provided with a base member which can be inserted into a slip-on shoe of the camera body. In order to change the direction of these known finders, it is necessary to separate them from the camera and then reinsert them in reversed position into the slip-on shoe or other holding means.

It is one object of the present invention to provide an improved finder which is likewise a slp-on instrument, but can be turned in its slipped-on position, in which the finder is connected with the camera.

Another object of the present invention consists in providing a finder casing carrying the optical elements, which is rotatably arranged in a slip-on base member.

Other objects and the advantages of the invention will be apparent from the following specification and claims and the appended drawings which show by way of example and without limitation some embodiments of the invention.

The eyepiece end of the finder casing is preferably overlapped by an eyepiece cap, in which the eyepiece aperture of the finder is located. By this overlapping, the eyepiece cap, which is hingedly connected with the slip-on base member and swingably arranged in the latter holds the finder casing in its selected position. If it is desired to reverse the direction of the finder by turning the same, in order to adapt the finder to another objective inserted in the camera, the locking of the finder can be released by causing the eyepiece cap to swing aside, so that the finder casing can be freely turned in its slip-on base. After this turning is carried out, preferably to an extent limited by a stop, the eyepiece cap is caused to swing back to its previous position and thereby hold the finder in its new position.

According to the invention the eyepiece cap is arranged to be under spring effect in such manner that it is automatically held at the finder casing, as well as when swung away from said casing in a position preferably limited by a stop. For example, a tension spring is used which is fastened to a hook connected to the eyepiece cap on the one hand and to a hook fastened to the slip-on base, on the other hand. Thereby, the spring is arranged in such manner that after passing a dead point position, the spring is capable of pulling the eyepiece cap to the position at the casing as well as to the position swung away from the casing and to hold the cap in said positions.

According to an embodiment of the invention, the reversible finder of the invention is provided with means to correct the parallax. This means is constructed in such manner that the eye-piece opening of the finder is located in an aperture of the eyepiece cap and is adjustable therein. According to a preferred embodiment, the eyepiece opening is arranged in an adjusting plate which is swingably connected with the eyepiece cap and is provided with an arm which laterally projects from the eyepiece cap and serves as an adjusting handle. This arm carries a mark which is adjustable relative to a focusing scale arranged on the eyepiece cap. Said scale carries marks of distances in units of meters and feet, which have different colors, e. g. meters in black color and feet in red color, so that they can be easily distinguished.

These adjustments are preferably secured by detent means. For example, the adjusting plate is fixedly connected with a detent spring which has a bulge adapted to enter detent notches provided on the inner surface of the eyepiece cap.

The finder casing carries information showing the focal lengths of the exchangeable objectives, for which the finder shows the correct picture area. In order to avoid mix ups, in each position only the information is visible, for which the finder is adjusted in the respective position. A flap is provided on the eyepiece cap for covering any information which does not apply to the respective position.

Figure 2:
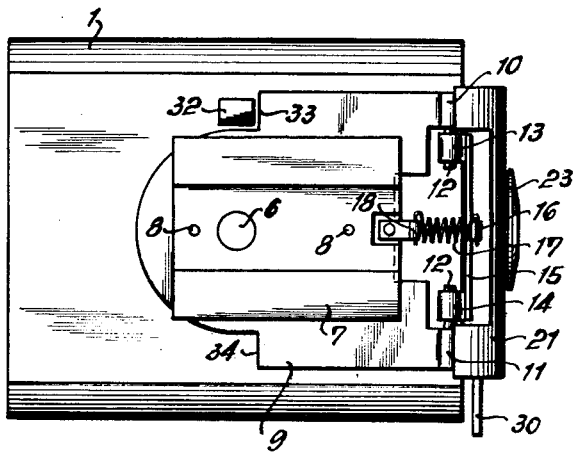
Figure 3:
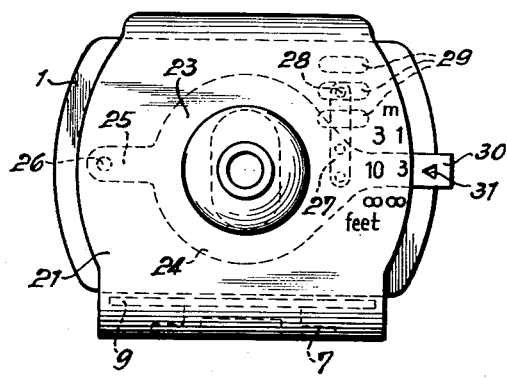
Figure 4:
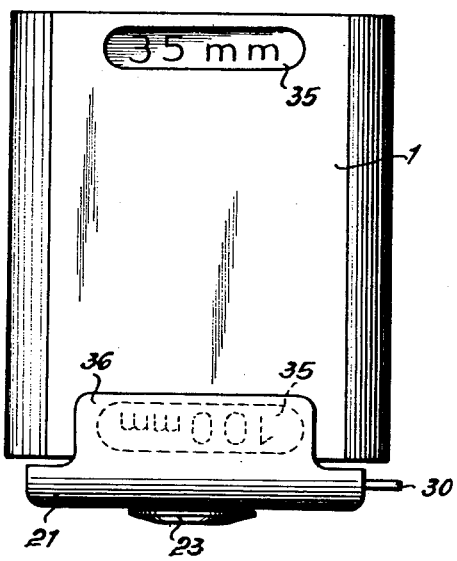

In the appended drawings, which illustrate by way of example and without limitation an embodiment of the invention, Figure 1 is a longitudinal sectional view through a view finder embodying the present invention. Figure 2 is a view of the lower side of the device shown in Figure 1. Figure 3 illustrates the eyepiece end of the finder, while Figure 4 is a top view.

Referring now to the drawings in detail, in Figure 1 reference numeral 1 denotes a finder casing which is preferably a molded piece made for example of a plastic molding composition, or other suitable material. The lenses of the optical system are denoted by reference symbols 2. View finder masks 3 and 4 for denoting fields included by the lenses are provided at both ends of the lens tube. Finder casing 1 is pivotally arranged by means of pins or plugs 5 and 6 in a slip-on base member 7. Between finder casing 1 and slip-on base member 7 a holding plate 9 is arranged, which is fixedly connected with slip-on base 7 by means of pins 8 and is rolled to hinge flaps 10 and 11 at one side. As shown particularly in Figure 2, the latter are connected by hinge pins 12 with hinge flaps 13 and 14, which are rolled up at one side of a cover plate 15. Between these hinge flaps 13 and 14 a hook 16 is bent from cover plate 15. One end of tension spring 17 is fastened to said hook 16 and the other end of said spring is fastened to a hook 18 which is fixedly connected to slip-on base member 7. Cover plate 15 is provided in its middle portion with an aperture 19. An eyepiece cap 21 is fastened by means of a rivet 20 to said plate 15 and said eyepiece cap partially overlaps the eyepiece end of finder casing 1.

A viewing window 23 is guided in an opening 22 of viewing cap 21 and said window is held in an adjusting plate 24. Said adjusting plate 24 is located in a space between cover plate 15 and eyepiece cap 21 and is swingably held on arm 25 on a plug 26 (see Figure 3) which is fastened to eye piece cap 21. A detent spring 27 is fixedly connected with adjusting plate 24 and a bulge 28 of said spring is adapted to enter detent grooves 29 provided on the inner surface of eyepiece cap 21. An arm 30 of adjusting plate 24 extends laterally from eyepiece cap 21 and carries a mark 31 which can be restingly adjusted relative to a distance scale which contains meter and feet marks and is provided on the outer side of eyepiece cap 21. Thereby adjusting plate 24 and together with it window 23 are moved in order to adjust the parallax and set said plate.

In order to carry out turning of finder casing 1, first eyepiece cap 21 and cover plate 15 must be caused to swing about hinges 10 to 14 by about 90°. Thereby the effect of tension spring 17, which holds eyepiece cap 21 and cover plate 15 in the position shown in Figure 1, is overcome.

As will be seen from Figure 1, tension spring 17 is located in a plane above hinge axis 12, in the drawing. Upon swinging eyepiece cap 21 together with cover plate 15 away, tension spring 17 is first stretched until its plane is in the range of the hinge axis. Upon further swinging in downward direction, tension spring 17 which becomes now released will be located in a plane below the hinge axis so that its tension will cause further swinging in downward direction. In this manner eyepiece cap 21 and cover plate 15 are brought into a swung away position limited by a stop and are held in this position.

Finder casing 1 can now be turned. The turning movement of the casing is limited by a lug 32 (see Figure 2) which is provided on the lower side of the casing, and comes to lie against stop edges 33 and 34 of holding plate 9. The end positions of finder casing 1 are secured by eyepiece cap 21 and cover plate 15 which span the casing in the swung down position in such manner that a turning or reversing movement is prevented.

The upper side of casing 1 is provided with information showing the focal lengths of exchangeable objectives for which the reversible finder indicates the correct picture area. In the embodiment shown by way of example in Figures 4 and 1 such writing appears in recesses 35. A flap 36 of eyepiece cap 21 covers in the operative position of the finder one of these recesses so that only one statement is visible. Such information states the focal length of the objective for which the finder is adjusted in the respective case. Thus in Figure 4 the reversible finder is set for an exchangeable objective having a focal length of 35 mm.

It will be understood that this invention is not limited to the specific constructions, designs and other details specifically described above and illustrated in the drawings and can be carried out with various modifications without departing from the scope of the invention, as defined in the appended claims.

What is claimed is:

1. Reversible viewfinder for photographic cameras provided with interchangeable objectives having varying focal lengths, said viewfinder comprising a casing provided with at least one lens system, said casing being rotatably arranged about a pivot which is perpendicular to the optical axis of the finder, said pivot being fastened in a slip-on member adapted to be applied to the camera; the viewfinder being capable of being used from either end, whereby the finder shows in one direction a first field of view which corresponds to the field of view of a first interchangeable camera objective of predetermined focal length and shows in a direction reversed by 180° a second field of view which corresponds to the field of view of a second interchangeable camera objective of predetermined focal length; the fields of view being inclosed by finder masks which are firmly built in in said casing; a cap provided with a viewing window, said cap being fastened to said slip-on member, said cap being tiltable about an axis which is perpendicular to said pivot and being urged to constantly lie against the finder casing, by the action of a tension spring, said cap partially overlapping the finder casing and preventing its reversal in this position, while permitting reversal of the finder casing upon swinging aside the cap from the finder casing.

2. Reversible viewfinder as claimed in claim 1, in which the finder casing carries on both ends of its upper outer side information on those objective focal lengths for which the finder shows the proper field of view and said tiltable cap is provided with a flap for covering part of said information.

3. Reversible viewfinder as claimed in claim 2, comprising means for adjusting parallax arranged in the tiltable cap, said means consisting of an adjusting plate which is movably arranged on said cap; the adjusting plate being firmly connected with a detent spring provided with a bulge which is adpated to enter grooves provided on the interior side of the cap; the adjusting plate being also provided with an arm which is adapted to serve as an adjusting handle, said arm laterally extending from the cap and being provided with a mark; said mark being adjustable to a scale of distances by means of said detent spring and said grooves, said scale being provided on the eyepiece cup.

References Cited in the file of this patent

UNITED STATES PATENTS

| | | |
|---|---|---|
| 1,152,782 | Bornmann | Sept. 7, 1915 |
| 1,671,588 | Wandersleb | May 29, 1928 |
| 1,933,784 | Wittel | Nov. 7, 1933 |
| 2,461,499 | McCathron | Feb. 8, 1949 |
| 2,529,944 | Houck | Nov. 14, 1950 |
| 2,552,940 | Cornut | May 15, 1951 |

FOREIGN PATENTS

| | | |
|---|---|---|
| 351,484 | Great Britain | June 26, 1931 |
| 368,603 | Great Britain | Mar. 10, 1932 |
| 417,285 | Great Britain | Oct. 2, 1934 |